Jan. 9, 1923.  
C. W. CASTLEMAN.  
WEEDER.  
FILED JUNE 23, 1921.
1,441,213
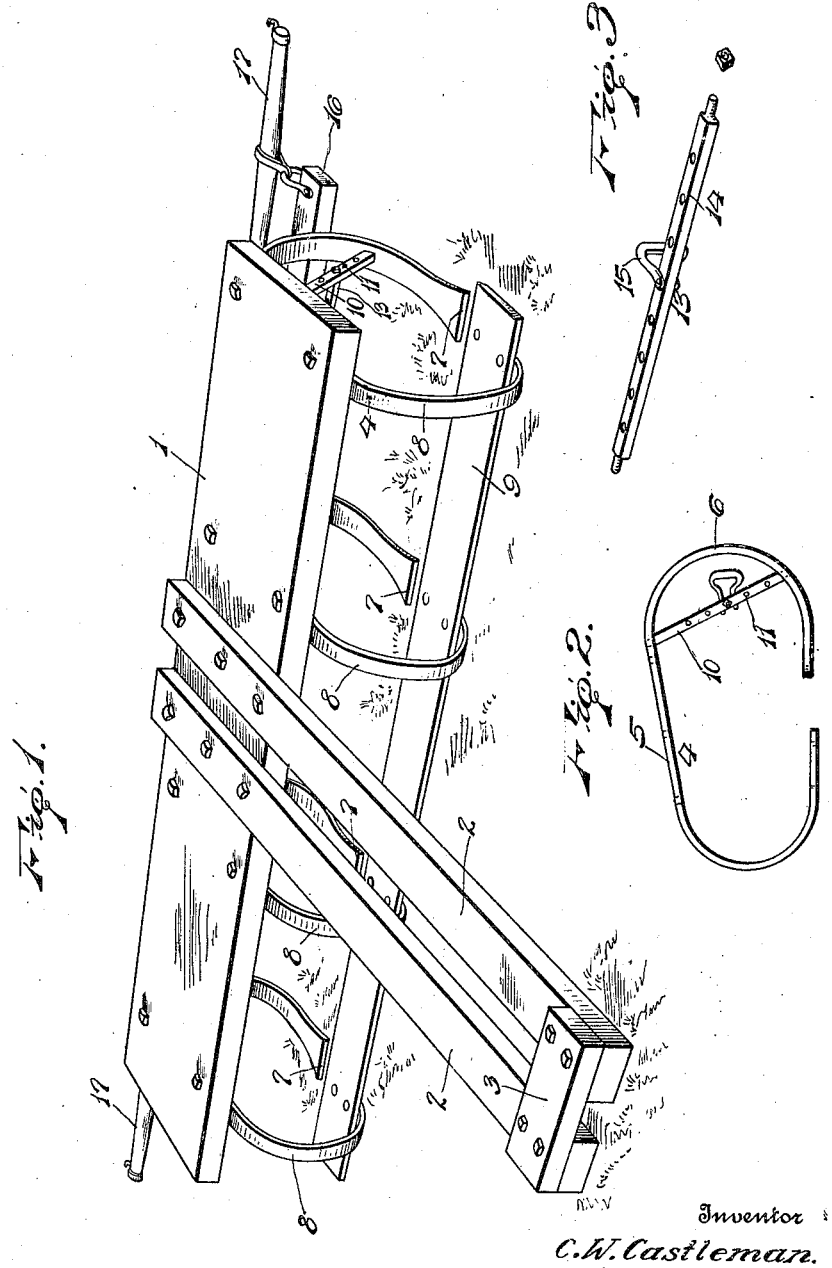
Inventor  
C. W. Castleman.
By Lacy & Lacy, Attorneys Patented Jan. 9, 1923.

1,441,213

UNITED STATES PATENT OFFICE.

CORBIN W. CASTLEMAN, OF LAMBERT, MONTANA.

WEEDER.

Application filed June 23, 1921. Serial No. 479,891.

*To all whom it may concern:*

Be it known that I, CORBIN W. CASTLEMAN, a citizen of the United States, residing at Lambert, in the county of Richland and State of Montana, have invented certain new and useful Improvements in Weeders, of which the following is a specification.

My invention relates to agricultural implements and has for its object the provision of a simple, inexpensive and efficient device by the use of which weeds and trash will be removed from a field and the surface thereof rendered smooth and level for the purpose of cultivation. The invention seeks to provide a device which may be readily cleared of accumulated trash and which, when in use, will be held steadily to its work so that the weeds will be uprooted and obnoxious growths destroyed. The invention is illustrated in the accompanying drawings and will be hereinafter fully described, the novel features being particularly pointed out in the appended claims.

In the drawings—

Figure 1 is a perspective view of an implement embodying my improvements;

Fig. 2 is a detail elevation of one of the combined runners and blade supports;

Fig. 3 is a detail view of a part of the draft-applying means.

In carrying out my invention, I employ a body member 1 which may conveniently be a stout board of suitable dimensions. To the said board, adjacent the center thereof, I secure the rearwardly extending bars 2 which may also be of wood and I preferably employ two parallel bars having their rear ends connected by a cross bar 3, the parallel bars extending rearwardly from the body member 1 for purposes which will presently appear.

At intervals, to the under side of the body member, I secure the combined runners and hangers 4 each of which consists of a metallic bar or rod having an intermediate straight portion 5 which is bolted rigidly to the underside of the body member, the forward end portion of the said device being curved downwardly and rearwardly, as shown at 6, whereby it constitutes a gage runner, the extremity of the said end portion being widened laterally in the illustrated form of the invention, as at 7, whereby it will present a flat face to the surface of the ground and will ride over the same without cutting thereinto. The rear portion 8 of the member 4 is curved downwardly and then forwardly and the extremity of the rear portion is disposed below the extremity of the front gage runner 6, as shown clearly in Fig. 2. A blade 9 is secured to and carried by the ends of the hanger members 8 and this blade is adapted to run below the surface of the ground so as to cut through roots and leave the surface free of weeds, straw and other trash which it is desired to remove.

Bracing supports 10 are secured to the runners 6 and the top straight portions 5 and may be bars of any convenient material. Each support is constructed with a series of openings 11 therethrough and in alined openings I secure the ends of a draft beam or bar 13 which is provided with a series of openings 14 therethrough. A clevis 15 is secured through any one of the openings 14 and a doubletree 16 is carried by said clevis singletrees 17 being carried by the doubletree in the usual manner. It will be readily understood that draft devices are provided at each side of the center and that the openings 11 and 14 permit them to be readily adjusted to obtain the best results.

My device is illustrated as arranged to be drawn by draft animals and it is intended that the driver shall stand upon the bars 2 so that his weight will aid in holding the implement to its work. The runners 6 will pass readily over the surface of the ground and will prevent the blade 9 working downwardly to a depth which would interfere with the easy travel of the implement over the field. When the uprooted material accumulates upon the blade and in advance of the hangers 8 to such an extent as to noticeably impede the progress of the implement, the driver dismounts and by then lifting the rear ends of the bars 2 may utilize the said bars as a lever to rock the implement upon the runners 6 so that the blade will be cleared of the accumulated trash, which may be subsequently gathered and destroyed. The implement may then be drawn forward as before until a second accumulation of trash is to be removed, as will be readily understood.

It will be readily noted that my implement is exceedingly simple and inexpensive so that it may be supplied at a cost which will permit its use by every farmer, and when in use it will prove highly efficient.

Having thus described the invention, what is claimed as new is:

1. An implement for the purpose set forth comprising a body member, combined runners and hangers secured through their central portions to the body member and having their end portions depending from said body member, the forward end portions of said runners and hangers being curved downwardly and rearwardly and the rear end portions thereof being curved downwardly and forwardly with the extremities of the rear end portions disposed below the extremities of the forward end portions but in the same vertical plane, a transverse blade secured to and connecting the ends of the rear end portions of said hangers and runners, and draft devices attached to the front end portions thereof.

2. An implement for the purpose set forth comprising a body member, a plurality of combined runners and hangers secured to and depending from the body member in parallel relation, a transverse blade secured to the ends of the hangers and connecting the same, braces extending from the lower portions of the runners to the point of attachment of same to the body member, a draft beam secured to and extending between the said braces, and draft-applying devices carried by the said beam.

In testimony whereof I affix my signature.

CORBIN W. CASTLEMAN. [L. S.]